(12) United States Patent
Wachenschwanz et al.

(10) Patent No.: US 7,471,484 B2
(45) Date of Patent: *Dec. 30, 2008

(54) PATTERNED MEDIUM AND RECORDING HEAD

(75) Inventors: David Wachenschwanz, Saratoga, CA (US); Michael McNeil, Nederland, CO (US); John Vicars, Loveland, CO (US)

(73) Assignee: WD Media, Inc., San Jose, CA (US)

( * ) Notice: Subject to any disclaimer, the term of this patent is extended or adjusted under 35 U.S.C. 154(b) by 674 days.

This patent is subject to a terminal disclaimer.

(21) Appl. No.: 10/863,648

(22) Filed: Jun. 7, 2004

(65) Prior Publication Data

US 2006/0139814 A1    Jun. 29, 2006

Related U.S. Application Data

(63) Continuation of application No. 10/077,200, filed on Feb. 15, 2002, now Pat. No. 7,019,924.

(60) Provisional application No. 60/269,517, filed on Feb. 16, 2001.

(51) Int. Cl.
*G11B 5/596* (2006.01)
(52) U.S. Cl. .................. 360/77.07; 360/48; 360/135; 360/60
(58) Field of Classification Search .................. None
See application file for complete search history.

(56) References Cited

U.S. PATENT DOCUMENTS

| | | | |
|---|---|---|---|
| 5,029,317 A | 7/1991 | Kawai et al. |
| 5,259,926 A | 11/1993 | Kuwzbara et al. |
| 5,482,777 A | 1/1996 | Yamakawa et al. |
| 5,482,785 A | 1/1996 | Mhavan et al. |
| 5,512,131 A | 4/1996 | Kumar et al. |
| 5,537,282 A | 7/1996 | Treves et al. |
| 5,568,331 A | 10/1996 | Akagi et al. |
| 5,673,156 A | 9/1997 | Chen et al. |
| 5,738,906 A | 4/1998 | Momose et al. |
| 5,750,270 A | 5/1998 | Tang et al. |

(Continued)

FOREIGN PATENT DOCUMENTS

EP    0509361 A2    10/1992

(Continued)

OTHER PUBLICATIONS

White, "Patterned Media: A Viable Route to 50 Git/in² and Up for magnetic Recording?" Dept. of Electrical Engineering, Stanford University, Stanford, CA 94305, 1996.

(Continued)

*Primary Examiner*—Andrew L. Sniezek
(74) *Attorney, Agent, or Firm*—Stuart B. Chinn, Esq.; Blakely, Sokoloff, Taylor & Zafman LLP

(57) ABSTRACT

A magnetic recording system includes a patterned medium comprised of land areas and trough areas, a write element which writes the data to the patterned medium, and a read element which reads the data from the patterned medium and servo information from the troughs. The land areas store data and the trough areas inhibit storage of data. The read element is wider than the write element.

10 Claims, 9 Drawing Sheets

U.S. PATENT DOCUMENTS

| | | | |
|---|---|---|---|
| 5,772,905 | A | 6/1998 | Chou |
| 5,786,093 | A | 7/1998 | Naruse et al. |
| 5,820,769 | A | 10/1998 | Chou |
| 5,828,536 | A | 10/1998 | Morita |
| 5,940,250 | A | 8/1999 | McNeil et al. |
| 5,956,216 | A | 9/1999 | Chou |
| 5,958,544 | A | 9/1999 | Usuki |
| 5,995,309 | A | 11/1999 | Suzuki et al. |
| 6,103,339 | A | 8/2000 | Lin et al. |
| 6,104,579 | A | 8/2000 | Kamoshita et al. |
| 6,120,836 | A | 9/2000 | Usuki |
| 6,123,603 | A | 9/2000 | Tada et al. |
| 6,146,755 | A | 11/2000 | Guha et al. |
| 6,150,015 | A | 11/2000 | Bertero et al. |
| 6,166,885 | A | 12/2000 | Yamamoto et al. |
| 6,168,845 | B1 | 1/2001 | Fontana et al. |
| 6,309,580 | B1 | 10/2001 | Chou |
| 6,381,090 | B1 | 4/2002 | Suzuki et al. |
| 6,391,213 | B1 | 5/2002 | Homola |
| 6,406,611 | B1 | 6/2002 | Engelhaupt et al. |
| 6,426,155 | B1 | 7/2002 | Tada et al. |
| 6,440,520 | B1 | 8/2002 | Baglin et al. |
| 6,482,742 | B1 | 11/2002 | Chou |
| 6,510,015 | B2 | 1/2003 | Sacks |
| 6,518,189 | B1 | 2/2003 | Chou |
| 6,572,922 | B1 | 6/2003 | Wang et al. |
| 6,594,103 | B1 | 7/2003 | Despain et al. |
| 6,606,208 | B2 | 8/2003 | Ishida et al. |
| 6,617,012 | B1 | 9/2003 | Wang et al. |
| 6,622,907 | B2 | 9/2003 | Fanti et al. |
| 6,624,957 | B1 | 9/2003 | Yun |
| 6,624,976 | B2 | 9/2003 | Takino |
| 6,665,145 | B2 | 12/2003 | Wada |
| 6,667,118 | B1 | 12/2003 | Chang et al. |
| 6,703,099 | B2 | 3/2004 | Belser |
| 6,713,197 | B2 | 3/2004 | Nakamura et al. |
| 6,738,207 | B1 | 5/2004 | Belser et al. |
| 6,748,865 | B2 | 6/2004 | Sakurai et al. |
| RE38,544 | E | 7/2004 | Chen et al. |
| 6,814,898 | B1 | 11/2004 | Deeman et al. |
| 6,858,319 | B2 | 2/2005 | Yasui et al. |
| 6,999,279 | B2 | 2/2006 | Lundstrom |
| 7,019,924 | B2 | 3/2006 | McNeil et al. |
| 7,147,790 | B2 | 12/2006 | Wachenschwanz |
| 7,225,528 | B2 | 6/2007 | Suwa et al. |
| 7,394,622 | B2 | 7/2008 | Gage et al. |
| 2001/0053051 | A1 | 12/2001 | Umehara et al. |
| 2002/0042027 | A1 | 4/2002 | Chou et al. |
| 2002/0071214 | A1 | 6/2002 | Belser |
| 2002/0086184 | A1 | 7/2002 | Wu et al. |
| 2002/0132482 | A1 | 9/2002 | Chou |
| 2002/0135939 | A1 | 9/2002 | Wada |
| 2002/0136927 | A1 | 9/2002 | Hieda |
| 2002/0167117 | A1 | 11/2002 | Chou |
| 2002/0177319 | A1 | 11/2002 | Chou |
| 2002/0186506 | A1 | 12/2002 | Sato et al. |
| 2002/0187295 | A1 | 12/2002 | Nishikawa et al. |
| 2003/0022024 | A1 | 1/2003 | Wachenschwanz |
| 2003/0034329 | A1 | 2/2003 | Chou |
| 2003/0064251 | A1 | 4/2003 | Uwazumi et al. |
| 2003/0080471 | A1 | 5/2003 | Chou |
| 2003/0080472 | A1 | 5/2003 | Chou |
| 2003/0162057 | A1 | 8/2003 | Matsunuma et al. |
| 2003/0170995 | A1 | 9/2003 | Chou |
| 2003/0170996 | A1 | 9/2003 | Chou |
| 2003/0179481 | A1 | 9/2003 | McNeil et al. |
| 2004/0058197 | A1 | 3/2004 | Nakamura et al. |
| 2004/0072036 | A1 | 4/2004 | Kubota et al. |
| 2004/0101713 | A1 | 5/2004 | Wachenschwanz |
| 2004/0224119 | A1 | 11/2004 | Yamakage et al. |
| 2004/0265570 | A1 | 12/2004 | Takahashi et al. |
| 2005/0036223 | A1 | 2/2005 | Wachenschwanz |
| 2005/0120545 | A1 | 6/2005 | Wachenschwanz et al. |
| 2005/0249984 | A1 | 11/2005 | Ohmori et al. |
| 2006/0006135 | A1 | 1/2006 | Homola et al. |
| 2006/0093863 | A1 | 5/2006 | Tsuchiya et al. |
| 2006/0289382 | A1 | 12/2006 | Kikitsu et al. |
| 2007/0041306 | A1 | 2/2007 | Wachenschwanz et al. |

FOREIGN PATENT DOCUMENTS

| | | |
|---|---|---|
| EP | 1258866 | 11/2002 |
| JP | 63-048610 A | 3/1988 |
| JP | 02-023517 A | 1/1990 |
| JP | 3-142702 | 6/1991 |
| JP | 3-142707 | 6/1991 |
| JP | 6-318302 | 11/1994 |
| JP | 10-149539 A | 6/1998 |
| JP | 2000099942 A | 4/2000 |
| WO | WO 00/48172 A2 | 8/2000 |

OTHER PUBLICATIONS

Tohge et al., "Patterning On Glass Substrates By The Sol-Gel Method", Journal of Non-Crystalline Solids 100:501-503, 1988.

S.E. Lambert et al., "Beyond Discrete Tracks: Other Aspects of Patterned Media", Journal of Applied Physics, Proceedings of the Thirty-Fifth Annual Conference on Magnetism and Magnetic Materials, Apr. 15, 1991, p. 4724-4727.

D.J. Twisselmann et al. "In-Plane Anisotropy in CoCr(Ta,Pt)/Cr Films Deposited Onto Substrates with Controlled Topography", Mat. Res. Soc. Symp. Proc. vol. 517, 1998 Materials Research Society, p. 193-198.

Noboru Tohge et al. "Fine-Patterning On Glass Substrates by the Sol-Gel Method", Journal of Non-Crystalline Solids, Proceedings of the Fourth International Workshop on Glasses and Glass Ceramics from Gels, Jul. 13-15, 1987, p. 501-505.

Merriam Webster's Collegiate Dictionary, 10th Edition, 1997.

Japanese Abstract of Patent Application Laid-open No. Hei 6-318302, Nov. 15, 1994.

Patent Abstracts of Japan, Publication No. 03-142702, publication date Jun. 18, 1991.

Japanese Abstract of Patent Application Laid-open No. Hei 3-142707, Jun. 18, 1991.

Japanese Patent Application No. 2002-285575, English Translation of Notice of the Reason For Refusal, dated Oct. 31, 2006, 3 pages.

Japanese Patent Application No. 2002-285575, English Translation of the Final Decision of Rejection, dated Jun. 19, 2007, 3 pages.

Malaysian Search Report, Application No. PI 20033891, dated Apr. 19, 2007, 1 page.

PATTERNED MEDIUM AND RECORDING HEAD

REFERENCE TO RELATED APPLICATIONS

This application is a continuation of application Ser. No. 10/077,200 filed Feb. 15, 2002 now U.S. Pat. No. 7,019,924 which claims priority to U.S. Provisional Application No. 60/269,517, filed on Feb. 16, 2001, the contents of which are hereby incorporated by reference.

TECHNICAL FIELD

This invention relates to a patterned medium having land areas for storing data and trough areas for inhibiting storage of data, and to use of the patterned medium with a read wide/write narrow recording head.

BACKGROUND

A magnetic disk drive is a digital data storage device that stores digital data on magnetic medium known as a disk. The disk, in general, comprises a plurality of tracks for storing the digital data. Data is stored on the tracks of the disk in the form of magnetic polarity transitions induced into a magnetic layer covering the disk.

During operation of the disk drive, the disk is rotated about an axis by a spin motor at a substantially constant angular speed. To perform a transfer of data with the disk, a transducer, known as a recording head, is centered above a track of the rotating disk. Once centered, the head can be used to transfer data to the track (during a write operation) or to transfer data from the track (during a read operation). During writing, for example, a write current is delivered to the centered head to create an alternating magnetic field in a lower portion of the head that induces magnetic polarity transitions onto the track. During reading, the centered head senses magnetic fields emanating from the magnetic polarity transitions on the moving track to create an analog read signal representative of the data thereon.

The recording head may be a dual element head having a read element for performing a read operation and a write element for performing a write operation. It is known to make the read element wider than the write element provided that the write element contains erase bands on its edges to "erase" old data from a track on the disk and thereby prevent the read element from sensing that old data. This configuration is described in U.S. Pat. No. 5,940,250 (McNeil et al.), the contents of which are hereby incorporated by reference into this application as if set forth herein in full.

SUMMARY

In general, in one aspect, the invention is a magnetic recording system that includes a patterned medium comprised of land areas and trough areas, a write element which writes the data to the patterned medium, and a read element which reads the data from the patterned medium. The read element is wider than the write element. The land areas store data and the trough areas inhibit storage of data. That is, the troughs prevent old data from being written outside of the land areas, making it possible to increase the width of the read element without causing the read element to sense out-of-track noise. Increasing the width of the read element can provide significant signal-to-noise advantages in the system.

The foregoing aspect may include one or more of the following features. The read element and the write element may be part of a recording head that flies over the patterned medium during reading and writing. The trough areas may have a depth relative to the recording head that is sufficient to prevent magnetic writing of data to the trough areas. The patterned medium may be made of a polymer layer disposed on a substrate, which layer defines the land areas and the trough areas. Examples of substrates include glass, NiP-clad aluminum alloy substrates, glass-ceramic substrates, and titanium substrates. The polymer layer also includes a magnetic layer. The read element may have a read width that is greater than the write width of the write element.

The patterned medium may include a rotatable magnetic disk having tracks that store the data. The tracks may be concentric, spiral, or of any other configuration. The tracks may include the land areas. The tracks may be separated on the rotatable magnetic disk by the trough areas. The land areas may include data islands that are isolated from one another by the trough areas. Each of the data islands may be capable of storing one bit.

In general, in another aspect, the invention is directed to a disk drive that includes a magnetic disk having a plurality of tracks which store data. The tracks include land areas for storing the data and trough areas which substantially isolate the land areas from one another. The disk drive also includes a recording head which transfers data to and from the magnetic disk. The recording head includes a write element and a read element. The read element has a width that is greater than a width of the write element.

This aspect of the invention may include one or more of the following features. An actuator arm may be included in the disk drive for positioning the head over the disk. The recording head may fly over the disk during reading and writing. The trough areas may have a depth relative to the recording head that is sufficient to prevent magnetic writing of data to the trough areas. The magnetic disk may be a patterned medium comprised of a polymer layer disposed on a substrate. The polymer layer defines the land areas and the trough areas and includes a magnetic layer thereon.

The land areas on the tracks may include data islands which are isolated from one another by the trough areas. Each of the data islands may be capable of storing one bit. The tracks may have a different density at an inner diameter of the magnetic disk than at an outer diameter of the magnetic disk. The trough areas may function as erase bands during writing on the magnetic disk.

The width of the read element may be between a value $R_{min}$ and a value $R_{max}$, where $R_{min} = TW$, and $R_{max} = TW + 2GAP - 2RTMR$, where TW corresponds to track width, GAP corresponds to a distance between adjacent tracks, and RTMR corresponds to misregistration of the read element on a track.

The width of the write element may be between a value $W_{min}$ and a value $W_{max}$, where $W_{min} = TW + WTMR$, and $W_{max} = TW + 2GAP - 2SQ$, where TW corresponds to track width, GAP corresponds to a distance between adjacent tracks, WTMR corresponds to misregistration of the write element on a track, and SQ corresponds to a reduction in distance between tracks due to misregistration of the write element.

In general, in another aspect, the invention is directed to a patterned magnetic storage medium. The storage medium includes a substrate and a layer formed on the substrate. The layer defines land areas and trough areas. The land areas store data and the trough areas inhibit storage of data between the land areas. This aspect of the invention may include one or more of the following features.

The land areas may be raised higher than the trough areas relative to the substrate. The trough areas may have a depth relative to the land areas that is sufficient to prevent magnetic writing of data to the trough areas. The land areas may include data islands that are isolated from one another by the trough areas. Each of the data islands may be capable of storing one bit. The land areas may be concentric or spiral tracks and the trough areas may separate the tracks from one another. The trough areas may function as erase bands for preventing writing of data between the land areas. The substrate may be glass, a NiP-clad aluminum alloy substrate, a glass-ceramic substrate, and/or a titanium substrate and the layer may be polymer having a magnetic layer deposited thereon.

In general, in another aspect, the invention is directed to an apparatus that includes storing means for storing data magnetically in data tracks. The data tracks are separated by erase bands that are physically stamped onto the storing means. The apparatus also includes a writing means which writes data to the storing means. Reading means reads data from the storing means. The reading means has a width that is greater than a width of the writing means. This aspect may include one or more of the following features.

The erase bands may be troughs that are formed on the storing means between the data tracks. The storing means may be a patterned medium formed of a polymer layer disposed on a substrate. The polymer layer may include the data tracks and the erase bands and may have a magnetic layer deposited thereon. The reading means and the writing means may be part of a recording means that flies over the storing means during reading and writing. The erase bands may be troughs that have a depth relative to the recording means that is sufficient to prevent magnetic writing of data to the troughs. The data tracks may include sequences of data islands separated by troughs.

In general, in another aspect, the invention is directed to a magnetic recording system which includes a patterned medium comprised of land areas and trough areas. The land areas store data and the trough areas inhibit storage of data. The system includes a recording head which reads and writes data to the land areas of the patterned medium. The recording head has a read element. The read element has a width that is greater than a width of the land areas. This aspect may include one or more of the following features.

The recording head may include a write element having a width that is less than the width of the read element and that is greater than the width of the land areas. The trough areas may have a depth relative to the recording head that is sufficient to prevent magnetic writing of data to the trough areas. The patterned medium may include a polymer layer disposed on a substrate. The polymer layer may define the land areas and the trough areas and may have a magnetic layer deposited thereon.

The patterned medium may be a rotatable magnetic disk having tracks which store data. The concentric tracks may be the land areas. The tracks may be separated on the rotatable magnetic disk by the trough areas. The land areas may include data islands which are isolated from one another by the trough areas. Each of the data islands may be capable of storing a block of data. A block of data may be one bit.

In general, in another aspect, the invention is directed to a magnetic recording medium that includes land areas which store data and trough areas which store servo information. Storing servo information in the trough areas makes it possible to provide continuous servo to a head scanning the recording medium, while at the same time increasing the amount of medium space available to store substantive data. This aspect may include one or more of the following.

The data in the land areas may be at a higher frequency than the servo information in the trough areas. The trough areas may include steps having a height that is less than the land areas relative to the troughs. The steps may comprise the servo information. A land area may be a data track; a first trough may border one side of the land area; and a second trough may border another side of the land area. The servo information in the first trough may be at a different frequency than the servo information in the second trough.

The troughs may include at least one of servo signals and grey code. The land and trough areas may be alternating concentric or spiral tracks. The land areas may include data islands isolated from one another by additional trough areas. Each of the data islands may be capable of storing a block of data. The block of data may be one bit.

In general, in another embodiment, the invention is directed to a magnetic recording system that includes a patterned medium comprised of land areas and trough areas. The land areas store data and the trough areas store servo information. The system includes a recording head that reads and writes data to the land areas of the patterned medium and reads servo information from the trough areas. This aspect may include one or more of the following features.

The recording head may include a read element and a write element. The read element may have a width that is greater than a width of the write element. The data in the land areas may be at a higher frequency than the servo information in the trough areas. The recording head may be positioned sufficiently close to the land areas to read higher-frequency data and sufficiently close to the trough areas to read lower-frequency servo information. The trough areas may include steps, which have a height that is less than the land areas relative to the troughs. The steps may comprise the servo information.

A land area may include a data track; a first trough may border one side of the land area; and a second trough may border another side of the land area. The servo information in the first trough may be at a different frequency than the servo information in the second trough. The troughs may include at least one of servo information and grey code.

The land areas and trough areas may be alternating concentric or spiral tracks. The land areas may include data islands which are isolated from one another by additional trough areas. Each of the data islands may be capable of storing a block of data. The block of data may be one bit. The patterned medium may be a rotatable magnetic disk having alternating tracks which comprise the lands and troughs. The patterned medium may contain a data sector which stores phase locked loop information.

The magnetic recording system may include a lowpass filter which receives the data and servo information and outputs the servo information, and a highpass filter which receives the data and servo information and outputs the data.

In general, in another aspect, the invention is directed to a method of accessing data. The method includes moving a recording head over a patterned medium comprised of land areas and trough areas, the land areas storing data and the trough areas storing servo information, transferring data on a land area, reading servo information from trough areas at the same time as transferring the data, and using the servo information to move the recording head relative to the land area. This aspect may include one or more of the following features.

The land area may include a data track; a first trough may border one side of the land area; and a second trough may border another side of the land area. The servo information is used to move the recording head by comparing servo information from the first trough to servo information from the second trough and re-positioning the recording head based on the comparison. The servo information in the first trough may be at a different frequency than the servo information in the second trough. The recording head may include a read element and a write element, the read element having a width that is greater than a width of the write element.

This summary has been provided so that the nature of the invention can be understood quickly. A description of illustrative embodiments of the invention is set forth below.

DESCRIPTION OF DRAWINGS

Like reference numerals in different figures indicate like elements.

DETAILED DESCRIPTION

During read and write operations in a disk drive, a recording head is maintained in a centered position above a desired track in a process known as track following. When using a dual element head, this process entails centering the write element during a write operation and centering the read element during a read operation. For various reasons, the write element of a dual element head is not always centered on a track when the corresponding read element is centered on the track and vice versa.

Figure 1:
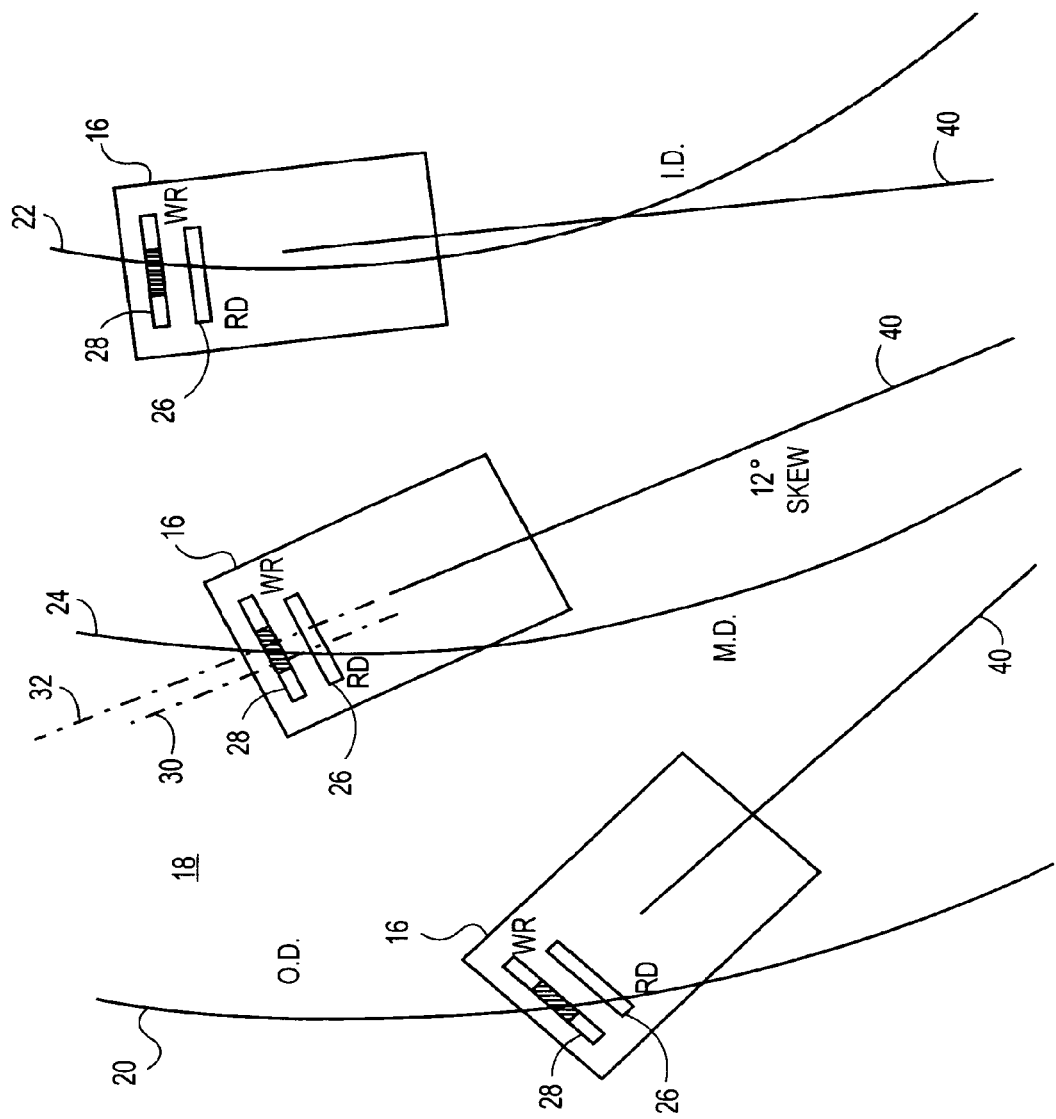
FIG. 1 is a diagram illustrating an offset between a read element and a write element in a dual element recording head and the effect the offset has when positioning the head over various tracks.

FIG. 1 is a top view illustrating a dual element recording head 16 in various positions above a disk 18. That is, the figure shows recording head 16 above a first track 20 at the outer diameter (O.D.) of disk 18, above a second track 22 at the inner diameter (I.D.) of disk 18, and above a third track 24 at a middle diameter (M.D.) of disk 18. It should be appreciated that three heads are shown in FIG. 1 for comparison purposes only and that, in general, there will be only one head above each disk surface in the drive. It should also be appreciated that the dimensions illustrated in FIG. 1 are exaggerated for illustration purposes.

As shown in FIG. 1, recording head 16 is located at the end of an actuator arm 40 that carries recording head 16 above the surface of disk 18. Actuator arm 40 pivots about a pivot point (not shown) so that the angle that arm 40 makes with each track centerline varies across the surface of the disk. This angle is known as the skew angle. Recording head 16 includes a read (RD) element 26 having a center defined by centerline 30 and a separate write (WR) element 28 having a center defined by centerline 32. As illustrated, read element centerline 30 is purposely offset in a lateral direction from write element centerline 32. Because of the combined effect of the skew angle and the offset between the read and write elements, read element 26 and write element 28 are usually not centered on the same track of disk 18 at the same time. That is, if one of the two elements is centered on a particular track, the other is generally off-center by a certain amount.

To perform the track following function, a servo system (not shown) is generally implemented that uses feedback information, read from disk 18 by read element 26, to properly position recording head 16. Because read element 26 provides the feedback information to the servo system, the system will center read element 26, rather than write element 28, if additional information is not supplied to the servo system. During a write operation, therefore, a compensation value is delivered to the servo system to center write element 28, if additional information is not supplied to the servo system. The compensation value delivered to the servo system generally varies across the surface of the disk based on the combined effect of the skew angle and the offset between the elements.

Even when a servo system is being used by the disk drive to position the head, a certain amount of misalignment can exist between the centerline of an element of the recording head and the centerline of the desired track during normal disk drive operation. This misalignment is caused by various factors such as, for example, spindle run out, resonance and disk flutter, thermal track shift, head settling, actuator interactions, improper servo writing, and others. For a particular disk drive, the misalignment between the head element and the track during normal track following operations is specified by a track misregistration (TMR) value. The TMR value represents the maximum range of element misalignment that is probable during normal track following operations of the disk drive. That is, while the disk drive is track following, it is probable that the element centerline will be somewhere within the range specified by the TMR value and improbable that the head will be outside of this range. In general, the TMR is a statistically derived value based on past observation in similar or identical disk drive systems.

One type of dual element recording head is a magnetoresistive head that includes a magnetoresistive (MR) read element and a separate write element that is usually inductive. MR read elements include a small piece of magnetoresistive material having a variable resistivity that changes based on an applied magnetic field. That is, as the magnetic field applied to the material increases, the resistivity of the material, in general, decreases. In practice, the MR material is held near the desired track as a substantially constant current is run through the material. The magnetic field variations produced by the magnetic transitions on the rotating track change the resistance of the magnetic material, resulting in a variable voltage across the material that is representative of the data stored on the disk (i.e., a read signal). MR read elements have gained much popularity in recent years as they typically generate read signals having considerably higher voltage than those generated by inductive read elements.

Dual element heads of the past utilized a write wide/read narrow approach. It has been determined, however, that this approach results in problems associated with a nonlinear servo position signal transfer function. Accordingly, read wide/write narrow dual element heads were developed. In a read wide/write narrow dual element recording head, the width of the read element exceeds the width of the write element.

Figure 2A:
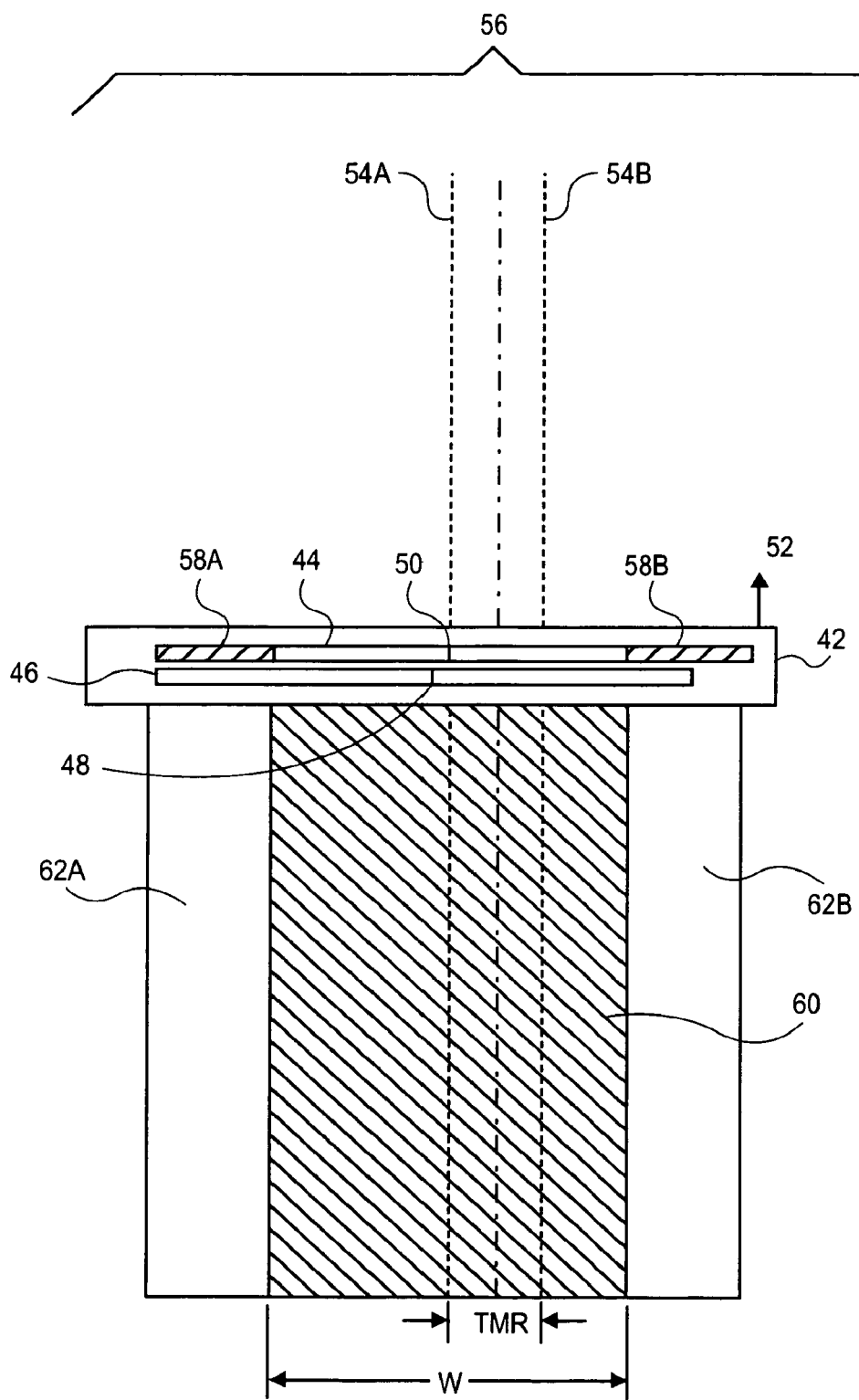
FIGS. 2A, 2B and 2C illustrate a write operation to a track, a second subsequent write operation to the same track, and using a dual element recording head having a read wide/write narrow architecture.
Figure 2B:
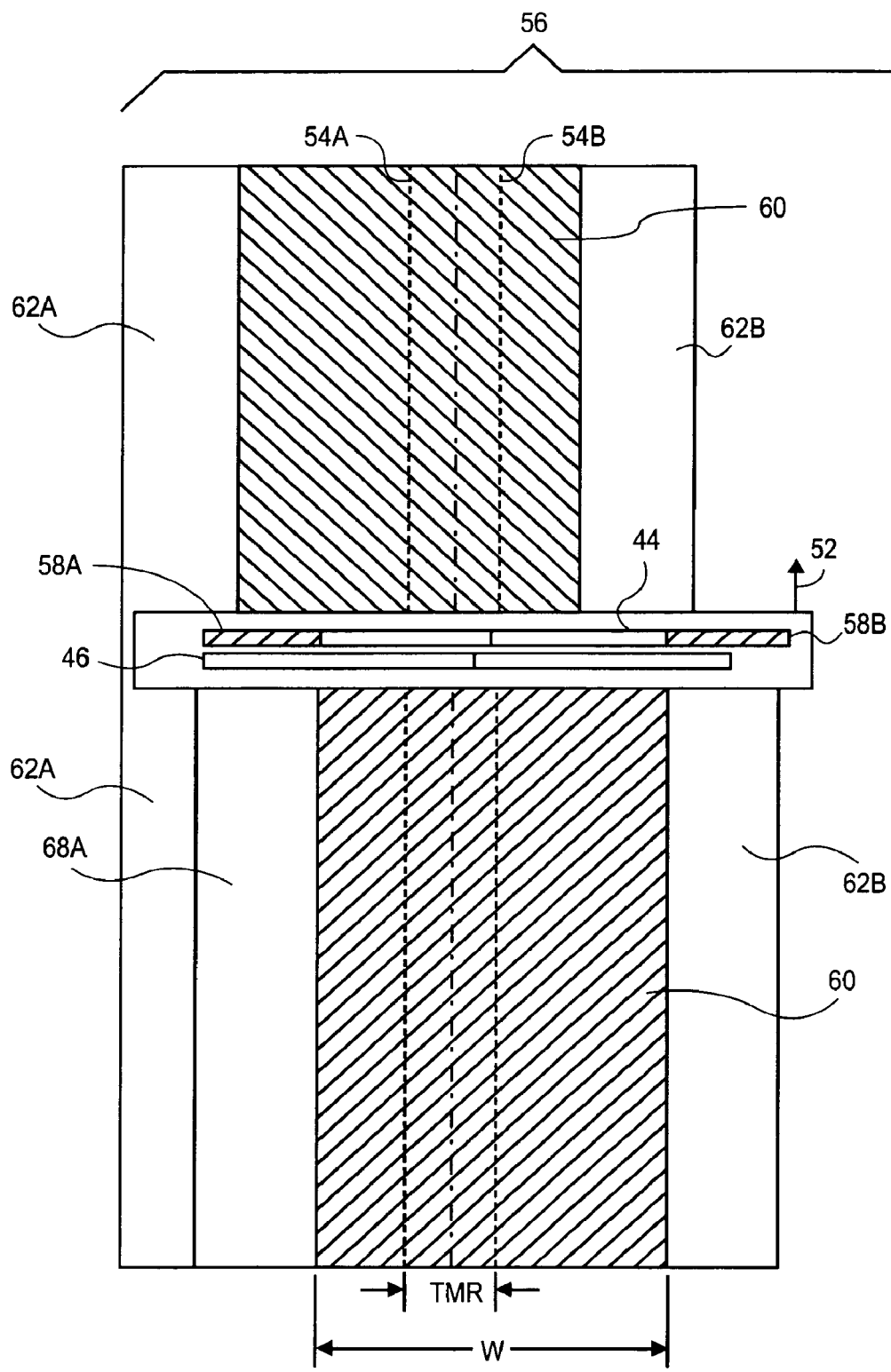
Figure 2C:
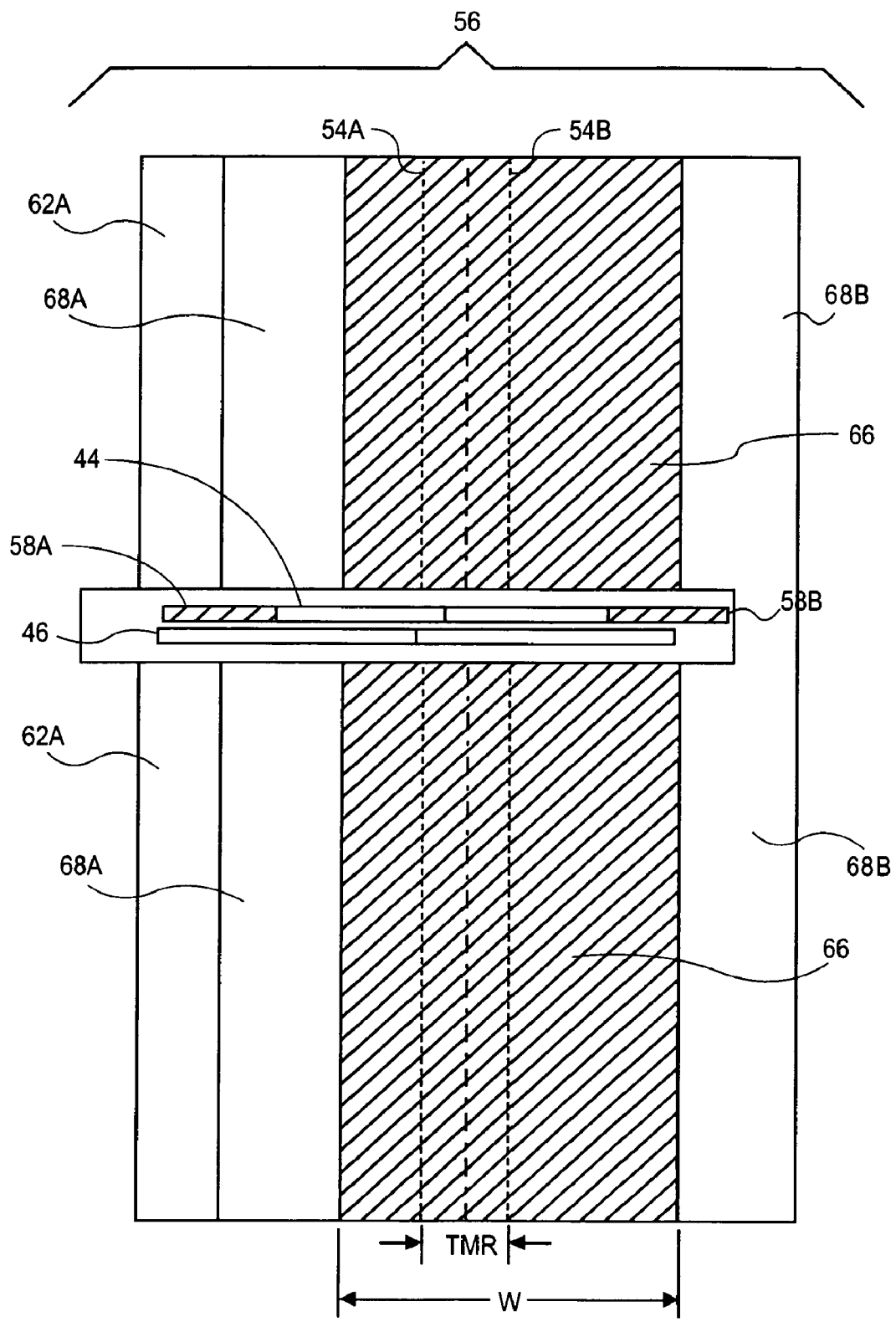

FIGS. 2A-2C illustrate the use, with a non-patterned medium, of a dual element recording head 42 having a read wide/write narrow configuration. In this context, a non-patterned medium is a recording medium, such as a magnetic disk, that is substantially smooth on its recording surface. That is, a non-patterned medium does not contain the physically imprinted land and trough areas described below.

Dual element recording head 42 includes a write element 44 having a write width (W) and read element 46 having a read element width (R), where the read width is greater than the write width. Recording head 42 also includes a read element centerpoint 48 and a write element centerpoint 50 that are substantially laterally offset from one another with respect to direction of travel 52 of the recording head. Boundary lines 54A, 54B represent the TMR boundaries for data track 56.

In addition, write element 44 includes erase bands 58A and 58B for creating magnetic erase bands on either side of the data written onto track 56 by write element 44. The magnetic erase bands are formed of magnetic flux at the edges of write element 44. This flux is inherent in all write elements and may be increased or decreased to increase or decrease, respectively, the size of the magnetic erase bands. Although the operation of the magnetic erase bands is not strictly necessary for the present invention, a description thereof may aid in understanding benefits provided by the patterned media described below.

FIG. 2A illustrates a first write operation to track 56 using dual element recording head 42. During a first write operation, write element 44 is centered on the left TMR boundary 54A and therefore writes first data 60 off-center to the left on track 56. Magnetic erase bands 58A, 58B of write element 42 create first erase strips 62A, 62B. In this context, erase strips 62A, 62B comprise areas of track 56 where no readable data is stored.

FIG. 2B illustrates a second, subsequent write operation to track 56. During the second write operation, write element 44 is centered on right TMR boundary line 54B and, therefore, writes second data 66 on track 56 off-center to the right. Also, erase bands 58A, 58B of write element 44 create second erase strips 68A, 68B on either side of second data 66 during the second write operation. As illustrated, second erase strip 68A on the left of data 66 erases any of first data 60 that would otherwise have remained on track 56 after the second write operation. Thus, during the subsequent read operation of FIG. 2C, read element 46 will not sense first data 60 on track 56.

Figure 3:
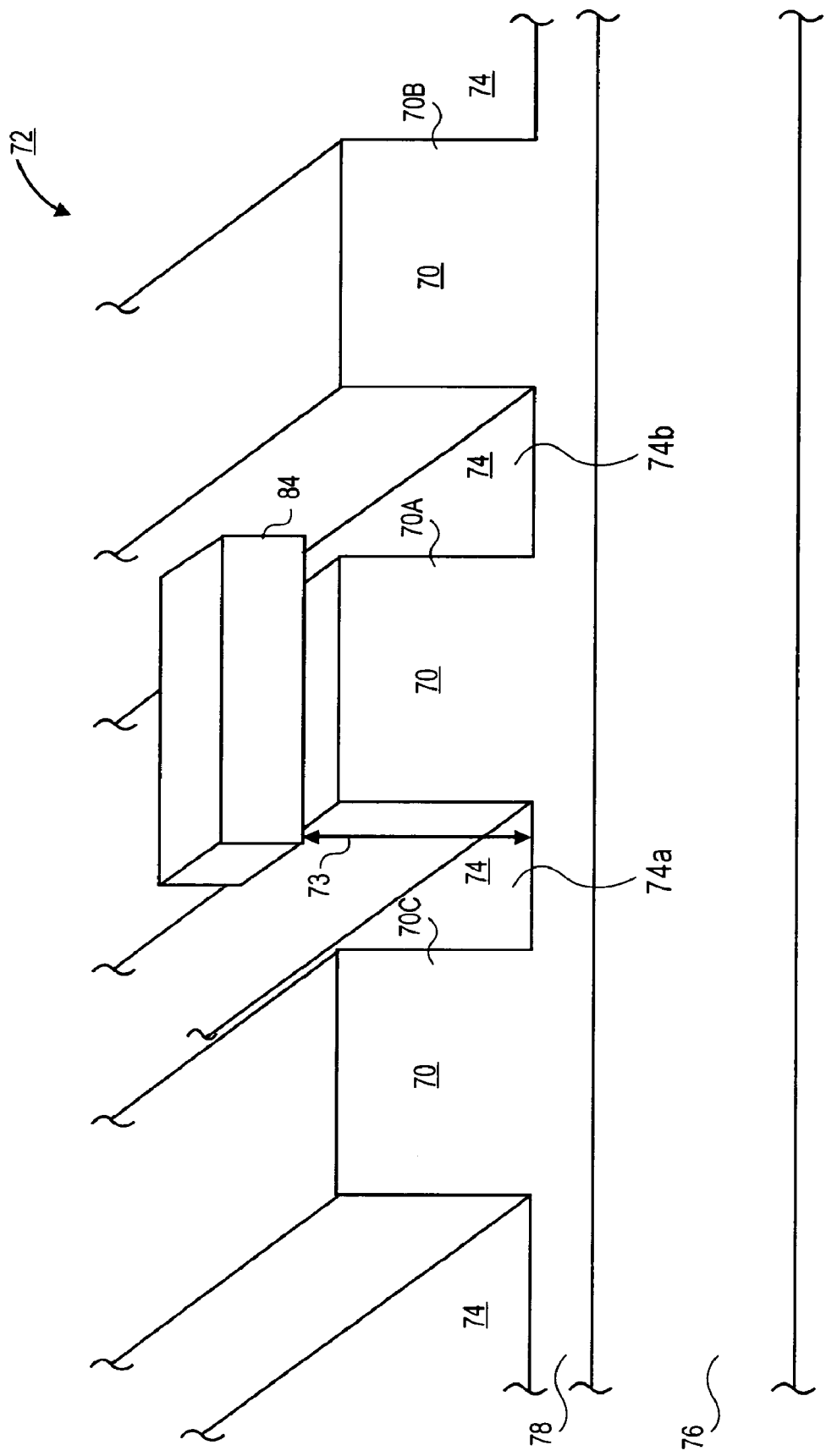
FIG. 3 is a cross-sectional, side, perspective view of a patterned medium and a write element of a read wide/write narrow dual element recording head.

Instead of, or in addition to, providing magnetic erase bands on the write element, effective erase bands may be physically formed (e.g., stamped) onto a patterned medium. A patterned medium is a magnetic storage device, such as a magnetic disk, that contains land areas ("lands") and trough areas ("troughs"). Referring to FIG. 3, lands 70 (70a-70c) are raised areas of patterned medium 72 and the troughs 74 (74a, 74b) are indentations located between lands 70.

Figures 4, 5:
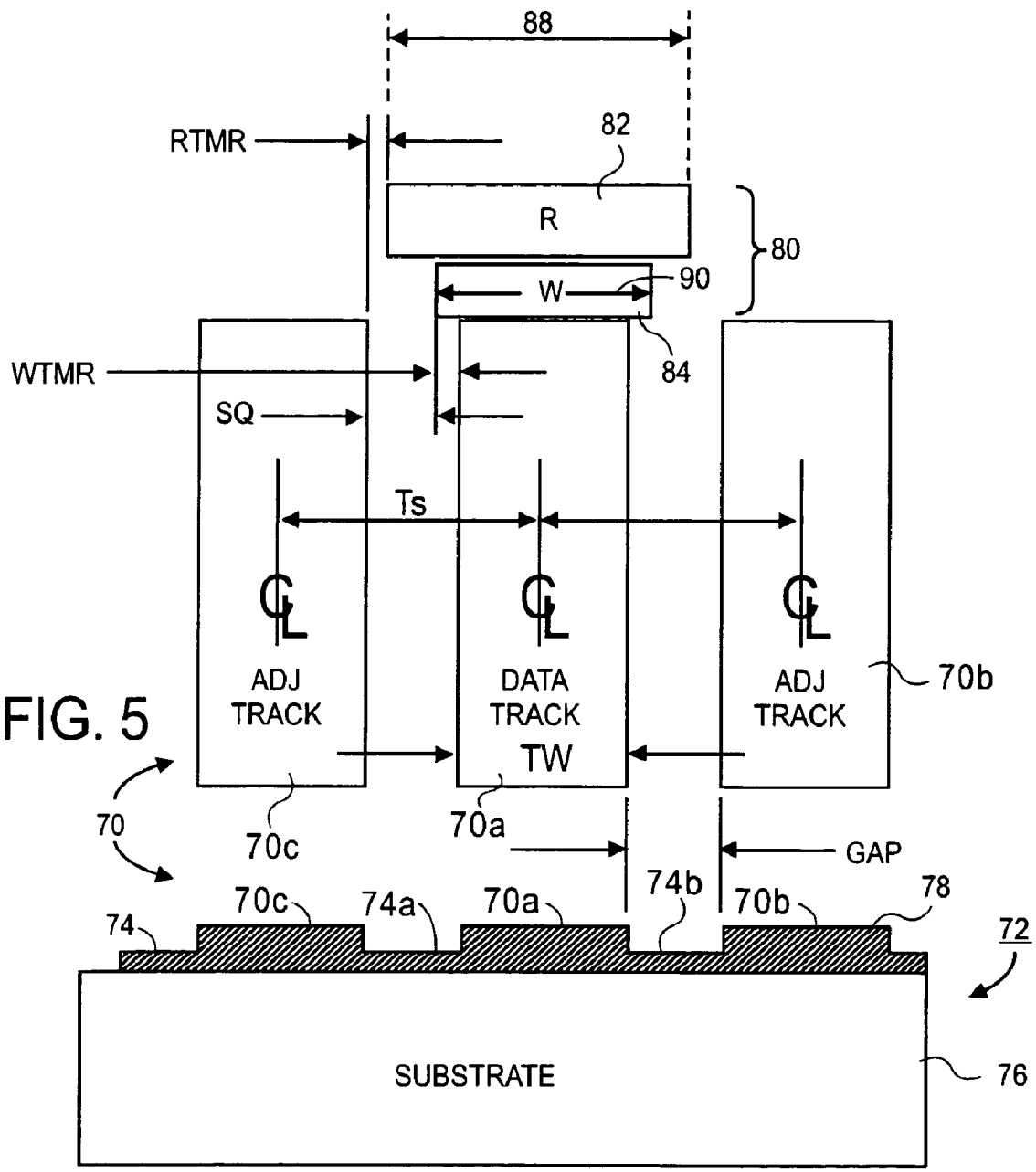
FIG. 4 is a cross-sectional, side view of the patterned medium, illustrating components that make up the patterned medium.
FIG. 5 is a top view of the patterned medium and the relationship of the patterned medium to a read element and a write element of a dual element recording head.

Referring to FIGS. 3 and 4, patterned medium 72 is a magnetic disk comprised of a substrate 76 and a polymer layer 78 disposed atop the substrate. One example of a polymer that may be used is plastic; however, other types of polymers may be used instead of, or in addition to, plastic. Instead of using a polymer layer, a layer may be used that is comprised of a glazing compound containing silica that is processed in its uncured state and subsequently cured at a high temperature. The following article, the contents of which are incorporated herein by reference, describes a process for making such a layer: "Fine Patterning On Glass Substrates By The Sol-Gel Method", Tohge et al., Journal of Non-Crystalline Solids 100 (1988), pgs. 501-505. Examples of substrates that may be used for substrate 76 include, but are not limited to, glass substrates, NiP-clad aluminum alloy substrates, glass-ceramic substrates, and titanium substrates. A magnetic layer (not shown) is deposited over the polymer (or silica/Sol-Gel) layer, either before or after stamping of the pattern. The land/trough pattern is stamped onto layer 78 of the medium using a mold that holds an inverse of the land/trough pattern.

The troughs have a depth relative to the recording head and/or the lands that is sufficient to inhibit storage of data in the troughs at the frequency that the data is written. During a write operation, the read wide/write narrow recording head is positioned over the lands such that the lands are substantially covered by both the read and write elements. The read element is wider than the write element and the write element is at least as wide as the lands and may be wider.

During writing, the recording head "flies", i.e., moves, over the patterned medium. The troughs are sufficiently far from the recording head to inhibit, and preferably to prevent, writing of data inside the troughs. That is, the troughs are far enough away from the recording head to prevent the flux transitions caused by the write element from affecting the magnetic polarity of the areas of the medium defined by the troughs. The lands, however, are sufficiently close to the recording head to permit magnetic writing of data thereon.

Thus, when data is written to patterned medium 72, the lands constitute the data tracks and the troughs constitute effective erase bands. On a circular magnetic disk, the lands and troughs may be formed as alternating concentric circles (taking into account any servo spokes formed onto the magnetic disk). The troughs isolate the lands (i.e., the data tracks) from one another, resulting in data tracks that are defined clearly both physically and magnetically.

Alternatively, the lands and troughs may be alternated spirals. Other track configurations also may be used.

FIG. 5 shows a top view of the patterned medium of FIGS. 3 and 4. As shown in FIG. 5, a recording head 80, containing a read element 82 and a write element 84, is positioned over a land 70a (a data track). In one pass, write element 84 writes data to the land. Data is not, however, written to troughs 74a and 74b that are adjacent to land 70a because write element 84 is positioned vertically (arrow 73 in FIG. 3) too far above the troughs to induce magnetic transitions in the troughs at the frequency at which the data is written.

Thus, if new data is written to land 70a, e.g., on a second pass by write element 84, there should be no residual data from the first pass on the land 70a or in the troughs 74a and 74b. Accordingly, when read element 82 reads data from track 70a, only data from the second pass will be read. To achieve these advantages, constraints may be placed on the widths of the read element and the write element.

Referring to FIG. 5, constraints for the width 88 of read element 82 and the width 90 of write element 84 are determined as follows. The minimum width ($R_{min}$) of the read element may be constrained as follows:

$$R_{min} = TW,$$

where TW is the width of track 70a (i.e., lands) formed onto patterned medium 72. The width of the read element should not be less than the track width, i.e., R TW. The minimum width of the write element ($W_{min}$) may be constrained as follows:

$$W_{min} = TW + WTMR,$$

where TW is as defined above and WTMR is an amount of write element misregistration (i.e., the amount of TMR that may occur with respect to write element 84).

The read element TMR (RTMR) is the amount of TMR that may occur with respect to read element 82. The minimum off-track registration capacity of the recording head (OTR $C_{min}$) is defined as follows $$OTRC_{min} = (R - TW)/2 = RTMR.$$

Track spacing (Ts) is defined as the sum of TW and the gap (GAP) between adjacent tracks, such as 70a and 70b, or $$Ts = TW + GAP.$$

Squeeze (SQ) is the amount by which the gap between adjacent tracks is reduced when write element 84 extends beyond the width TW of track 70 and into trough 74a. Squeeze is defined as follows $$SQ = WFG + \text{Overshoot},$$

where WFG is the "Write Fault Gate", which corresponds to a predetermined limit that a head can write when it is off-track, the magnitude of which is determined by servo position information, and "Overshoot" is the amount by which the recording head exceeds the WFG when writing during seeking or during a shock event. Overshoot is a constant that is determined empirically based on parameters of the disk drive, and especially by the servo bandwidth.

The OTRC under a squeeze condition ($O_{SQ}$) is defined as follows by setting the squeeze margin to zero $$O_{SQmargin} = Ts - TW/2 - W_{max}/2 - SQ,$$

where $W_{max}$ is the maximum width of write element 84 and TS, TW and SQ are as defined above. Setting $O_{sqmargin}$ to zero and substituting "TW+GAP" for "Ts", results in the following $$0 = TW + 2GAP - TW/2 - W_{max}/2 - SQ.$$

Solving for $W_{max}$ results in $$W_{max} = TW + 2GAP - 2SQ.$$

The maximum width of the read element ($R_{max}$) may be defined based on the structure of the patterned medium and the dual element recording head as $$R_{max} = TW + 2GAP - 2RTMR.$$

Using a patterned medium, the read width of the read element can be increased significantly relative to read elements used with non-patterned media. One reason for this is that the troughs prevent old data from being written outside of the data track, making it possible to increase the width of the read element without fear of the read element sensing substantial amounts of old data. For example, in one embodiment, in which the TMR and track width tolerances scale at 110,000 tracks-per-inch (TPI, the width of the read element can be more than doubled, from 0.10 microns (µm) to 0.22µm. Increasing the width of the read element also provides signal-to-noise (SNR) ratio advantages. That is, the amount of valid data increases relative to noise from, e.g., old data. For example, it is possible to obtain a six (6) decibel (db) advantage in SNR using a patterned medium and read wide/write narrow recording head.

The invention is not limited to the above embodiments. The data tracks on the patterned medium may have the same or a different track or bit density at an inner diameter of the magnetic disk than at an outer diameter of the magnetic disk. For example, the data tracks may have a higher density at the inner diameter than at the outer diameter, i.e., Ts may vary.

Figure 6:
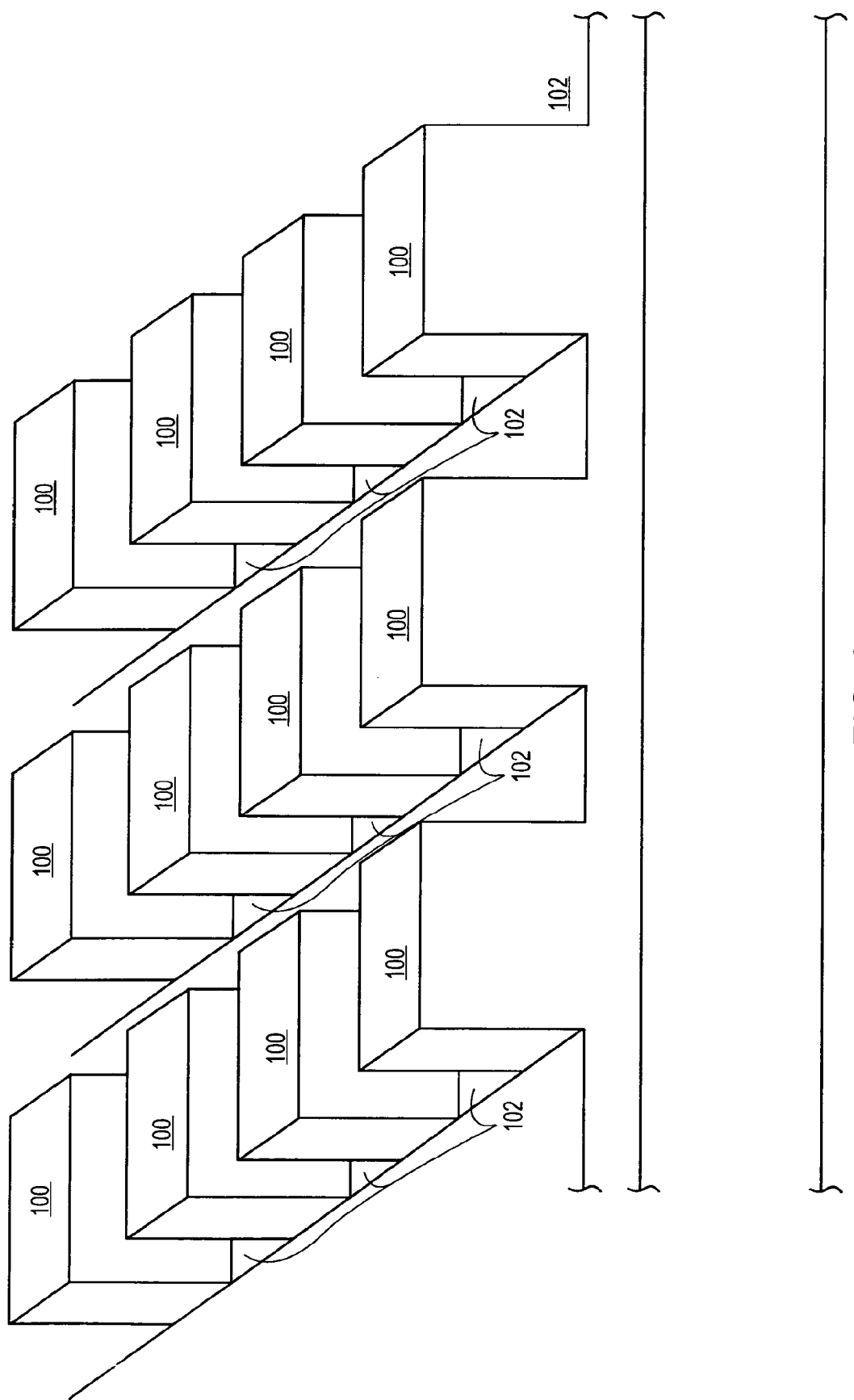
FIG. 6 is a cross-sectional, side, perspective view of a patterned medium that contains data islands in its data tracks.

The data tracks may include data "islands", as shown in FIG. 6. These data islands 100 each hold a block of data, which may be one bit or multiple bits, and are isolated/separated from one another by troughs 102 within the data track itself. As is the case with troughs 74 between the data tracks, the troughs 102 between data islands 100 have a depth relative to the recording head and/or data islands that is sufficient to prevent magnetic writing of data to the trough areas 102 (the depth of troughs 74 and 102 need not be the same). This configuration provides an added benefit in that it reduces the amount of noise (e.g., noise between tracks) that is sensed by the read element.

Servo information (e.g., position error information) may also be stored on the lands. The servo information may be stored on the lands using servo bursts at the start of each sector of a magnetic disk. For example, referring to FIGS. 4 and 5, the servo information may be recorded onto two or more sub-tracks (e.g., portions of tracks 70a, 70b and/or 70c) in a specific sector of the magnetic medium. Referring, alternatively, to FIG. 6, the servo information may be stored on the "data islands" and, in fact, may be defined by the frequency and positioning of the data islands themselves.

In an alternative embodiment, the troughs of the patterned medium may contain data, such as servo information. The servo information may be written to the bottom surface (or "floor") of the troughs (as magnetic transitions) at a lower frequency than the data written to the lands. For example, the servo information may be written at 1 MegaHertz (MHz) and the data on the lands may be written at 19 to 250 MHz. Writing the data and servo at these or other frequencies allows a read element, such the read element on read wide/write narrow recording head 80, to sense both data and servo information.

In more detail, the recording head is able to sense high-density data at a close distance. The recording head is also able to sense lower-density data at a farther distance. Accordingly, the data on the lands, which is closer to the recording head, can be written at a high density and the servo information in the troughs, which is farther away from the recording head, can be written at a lower density. Thus, the recording head can sense both simultaneously at the same flight height. In this embodiment, the read element is wider than the land and, accordingly, extends over the lands and into the troughs on either side of the land, allowing the read element to sense both the data and servo information.

The equation that governs the readability of data relative to the height of the recording head above the recording medium is called the Wallace equation. The Wallace equation is as follows:

$$FH = \frac{\lambda}{2\pi} ln\left(\frac{V_l}{V_h}\right).$$

In the Wallace equation, "FH" is the flying height of the recording head, i.e., the distance above the recording medium; "$\lambda$" is the wavelength in distance between two magnetic transitions that define data; "$V_l$" is the amplitude of the low flying height of the read element above the data magnetic transitions on the recording medium of the lands; "$V_h$" is the amplitude of the high flying height of the read element above the servo magnetic transitions in the troughs; and "ln" is the natural logarithm function.

The flying height (FH) that enables the read element to read low frequency magnetic transitions in the troughs is determined by solving the Wallace equation. The Wallace equation may also be used to confirm that the read element is able to sense the high frequency magnetic transitions (i.e., the data) on the lands.

Moreover, because the data (as opposed to the servo information) is written at a high frequency, the write element will not be able to write data in the troughs. As a result, the troughs are still able to act as effective erase bands.

Figure 7:
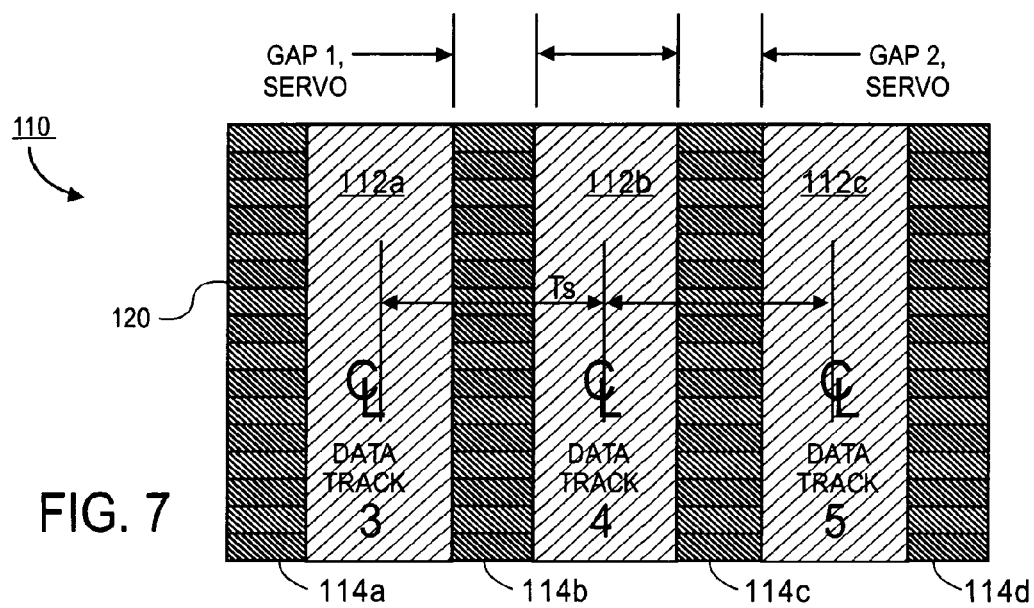
FIG. 7 is a top view of a magnetic recording medium comprised of lands for storing data and troughs having steps for storing servo information.

Instead of writing the servo information onto a smooth surfaced trough, patterned steps may be physically formed in the trough. The servo information includes the patterned steps, which create low frequency signals by the abrupt changes in magnetization created by the steps themselves. FIG. 7 shows an example of using patterned steps to store servo information (or even other data) in the troughs of a patterned magnetic recording medium 110.

Figure 8:
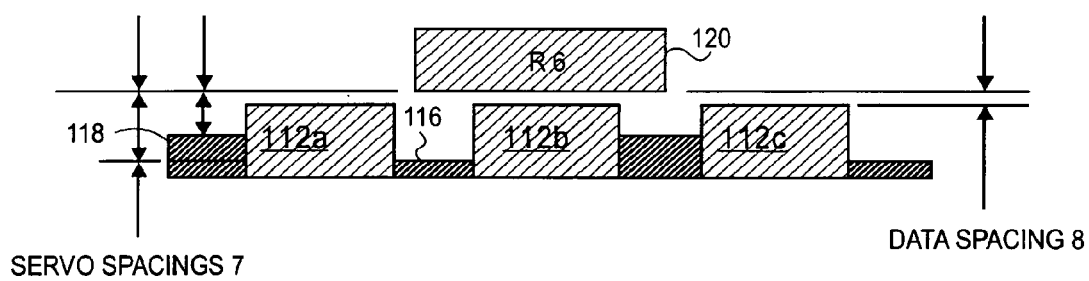
FIG. 8 is a cross-sectional, side view of the magnetic recording medium of FIG. 7.

In the example of FIG. 7, the lands and troughs comprise alternating concentric tracks of a magnetic disk; however, the invention is not limited as such. As noted, the lands and troughs may be spirals or have any other configuration. Lands 112a, 112b and 112c may be used to store data, as described with respect to FIG. 5 above. The lands may also include data islands, as shown in FIG. 6 above. Here, troughs 114a, 114b, 114c and 114d contain two levels—a "floor" level 116 and steps 118, as depicted in FIG. 8 (the lines 120 in FIG. 5 indicate the depth differences in the troughs). The steps have a height, relative to floor 116, that is less than the height of the lands. Servo information includes the steps, as above, positioned at a lower frequency than data is written onto the lands.

If the floor 116 of a trough is deep enough and the frequency of the steps is low enough, the servo information will be lower in bandwidth than the data, but still readable by the read element of the recording head. The Wallace equation is used to determine the flying height of the recording head relative to the steps and the lands and the frequencies of the data and servo information.

The servo information stored in the troughs (either on patterned steps or as magnetic transitions on the "floor") is at different frequencies on either side of a land. As shown in FIG. 7, the servo information (on each of the patterned steps) is at a higher frequency in trough 114b to the left of land 112b than the servo information in trough 114c to the right of land 112b. The difference in frequencies of the servo information permits continuous servo of the recording head. That is, a controller (not shown) takes the difference in the amplitude between the servo information from trough 114b and the servo information from trough 114c. The magnitude of this difference indicates whether the recording head is veering too far towards one trough or the other. In such an event, the controller adjusts the position of the recording head to compensate for the unwanted veering. The head is on-track when the amplitudes of the signals from 114b and 114c are equal.

The servo information written to the troughs may include servo signals and/or grey code. The servo signals include data that is used to ascertain the position of the recording head. The grey code is data that defines the track addresses of data tracks on the magnetic recording medium.

Figure 9:
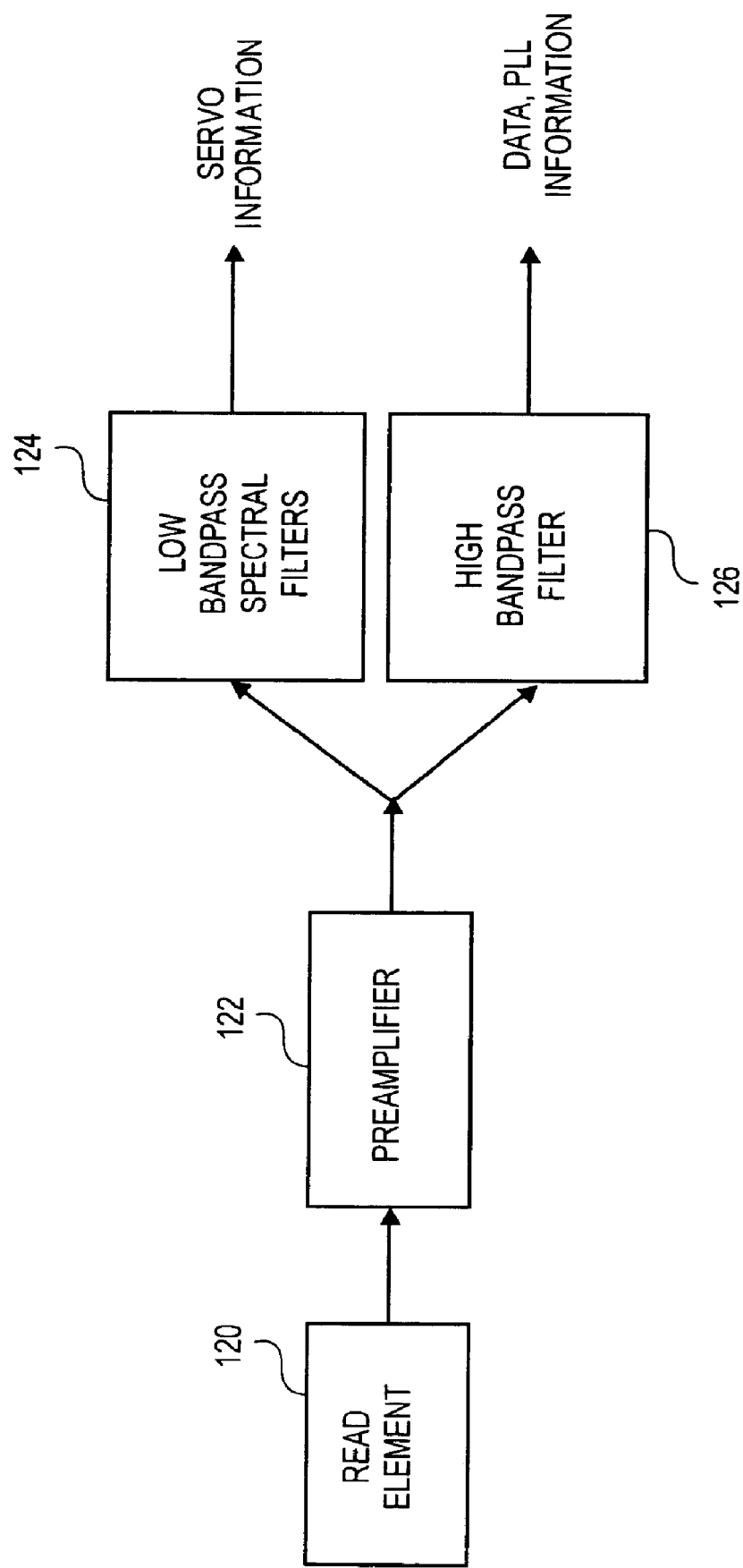
FIG. 9 is a block diagram of a magnetic recording system that includes a magnetic recording medium having servo information written into troughs of a patterned medium.

In operation, as a recording head 120 moves over a land 112b, the read element (not shown) of the recording head senses servo information in troughs 114b and 114c that border the land 112b on the left and right, respectively. The read element reads the servo information from the troughs along with the data from the lands. Referring to FIG. 9, the servo information and data is transmitted from the read element 120 to a preamplifier 122. Preamplifier 122 amplifies the signals read by the read head and transmits the amplified signals to a lowpass filter 124 and a highpass filter 126.

The lowpass filter 124 transmits low frequency servo information from troughs 114b and 114c to the controller. The controller compares (e.g., takes the difference between) the servo information from trough 114b and the servo information from trough 114c. The controller compares the resulting difference value to one or more preset values in order to determine if the recording head has veered too much into one trough or other. If so, the controller issues a signal to correct the position of the recording head.

The highpass filter 126 receives the output of preamplifier 122 and passes high-frequency signals only, i.e., data from the lands and PLL (phase locked loop) information (which is timing information that may be contained in dedicated data sectors on the magnetic recording medium).

By storing servo information and grey code in the troughs, the size of dedicated data sectors can be increased relative to recording media that also store the servo information and the grey code in dedicated data sectors. As a result, there is more room on the recording medium for data.

The invention is not limited to the specific embodiments set forth above. The different features of the various embodiments can be combined. For example, the data islands of FIG. 6 may be combined with the stepped troughs of FIG. 7 in a single patterned magnetic recording medium. The stepped trough magnetic recording medium may be formed in the same manner as the other patterned media described above. In this regard, the patterned medium is not limited to a polymer layer on a glass substrate. Any type of imprintable magnetic recording material may be used. The patterned medium is not limited to magnetic disks or other rotatable media. The patterned medium may be magnetic tape or the like.

Other embodiments not specifically described herein are also within the scope of the following claims.

What is claimed is:

1. A magnetic recording system comprising:
    a patterned medium comprised of land areas and trough areas, the land areas for storing data and the trough areas for inhibiting storage of data;
    a write element which writes the data to the patterned medium; and
    a read element which reads the data from the patterned medium, the read element being wider than the write element, wherein the read element and the write element are part of a recording head that flies over the patterned medium during reads and writes.

2. The magnetic recording system of claim 1, wherein the patterned medium comprises a polymer layer disposed on a substrate, the polymer layer defining the land areas and the trough areas and having a magnetic layer.

3. The magnetic recording system of claim 1, wherein the read element has a read width and the write element has a write width, the read width being greater than the write width.

4. The magnetic recording system of claim 1, wherein the patterned medium comprises a rotatable magnetic disk having tracks which store the data.

5. The magnetic recording system of claim 4, wherein:
the tracks comprise the land areas; and
the tracks are separated on the rotatable magnetic disk by the trough areas.

6. An apparatus comprising:
storing means for storing data magnetically in data tracks, the data tracks being separated by erase bands that are physically stamped onto the storing means;
writing means for writing data to the storing means; and
reading means for reading data from the storing means, the reading means having a width that is greater than a width of the writing means, wherein the reading means and the writing means are part of a recording head that flies over the storing means during reading and writing.

7. The apparatus of claim 6, wherein the erase bands comprise troughs that are formed on the storing means between the data tracks.

8. The apparatus of claim 6, wherein the storing means comprises a patterned medium formed of a polymer layer disposed on a substrate, the polymer layer having the data tracks and the erase bands and having a magnetic layer.

9. A method of accessing data, comprising:
moving a recording head over a patterned medium comprised of land areas and trough areas, the land areas storing data and the trough areas storing servo information;
transferring data on a land area;
reading servo information from trough areas at the same time as transferring the data using the recording head having a read element and a write element, wherein the read element is wider than the write element; and
using the servo information to move the recording head relative to the land area.

10. The method of claim 9, wherein:
the land area comprises a data track, a first trough borders one side of the land area, and a second trough borders another side of the land area; and
using the servo information to move the recording head comprises comparing servo information from the first trough to servo information from the second trough and re-positioning the recording head based on the comparison.

\* \* \* \* \*

UNITED STATES PATENT AND TRADEMARK OFFICE
CERTIFICATE OF CORRECTION

PATENT NO. : 7,471,484 B2  Page 1 of 1
APPLICATION NO. : 10/863648
DATED : June 7, 2004
INVENTOR(S) : Wachenschwanz et al.

It is certified that error appears in the above-identified patent and that said Letters Patent is hereby corrected as shown below:

On Title Page, line (73) Assignee:

Please delete "WD Media, Inc., San Jose, CA (US)" and replace therefore with -- WD Media, Inc., San Jose, CA (US); Maxtor Corporation, Longmont, CO (US) --

Signed and Sealed this

Ninth Day of November, 2010

David J. Kappos
*Director of the United States Patent and Trademark Office*